MAGNETIC AMPLIFIER CONTROL APPARATUS

Filed June 3, 1955 2 Sheets-Sheet 1

ROBERT C. BYLOFF,
INVENTOR.

BY John H. G. Wallace

ROBERT C. BYLOFF,
INVENTOR.

BY John H.G. Wallace

United States Patent Office 3,021,474
Patented Feb. 13, 1962

3,021,474

MAGNETIC AMPLIFIER CONTROL APPARATUS

Robert C. Byloff, Gardena, Calif., assignor to The Garrett Corporation, Los Angeles, Calif., a corporation of California Filed June 3, 1955, Ser. No. 513,091
21 Claims. (Cl. 323—89)

This invention relates to controls in general and particularly relates to a condition controller employing a magnetic amplifier.

The invention includes a magnetic amplifier employing in connection therewith novel means for providing proportional floating control of a device, and in that connection the novel features will be described as incorporated in a condition controller. Specifically the control of the present invention finds utility in obtaining and holding constant temperature within a chamber, regardless of external deviation factors.

Accordingly, it is an object of the invention to provide a proportional floating control employing a magnetic amplifier. It is a particular object to provide a control apparatus for a process variable, wherein the activation element is fully energized upon the occurrence of a signal output from the conversion element. In apparatus of this type having an electric motor as a part of the activation element, energization is accomplished on the full torque principle; that is, regardless of the amount of system unbalance, a small or large, full torque is applied by the activation element into which the corrective signals are fed. In other words, the amount of voltage applied to the activation element is independent of the system unbalance, and therefore the full voltage is applied at all times, providing much faster response while decreasing the possibility of over-shooting and hunting.

It is a further object of the invention to provide a proportional floating control employing a magnetic amplifier having an auxiliary winding adapted to modify the sensitivity of the magnetic amplifier for a predetermined time interval dependent upon a characteristic of the signal fed into the magnetic amplifier. It is a still further object to provide in connection with a controller of the magnetic amplifier type means for limiting the excursion of the activation element employed with the magnetic amplifier. Such a means takes the form of a sensing element coupled to an additional control winding on the magnetic amplifier. In the form of the invention disclosed herein it will be seen that the sensing element has no effect on the auxiliary winding until a predetermined range of the process variable has been exceeded.

The invention will best be understood from the following description when read in connection with the accompanying drawings, in which.

At various places on the drawings there are shown leads to be connected to "+D.C." Also, there are shown several ground connections, intended to be the equivalent of "—D.C." It will be apparent that all the positive direct current connections can be made to a single source, a battery for example. Likewise, the negative side of the single source can be grounded for the return circuits.

Figures 1, 5:
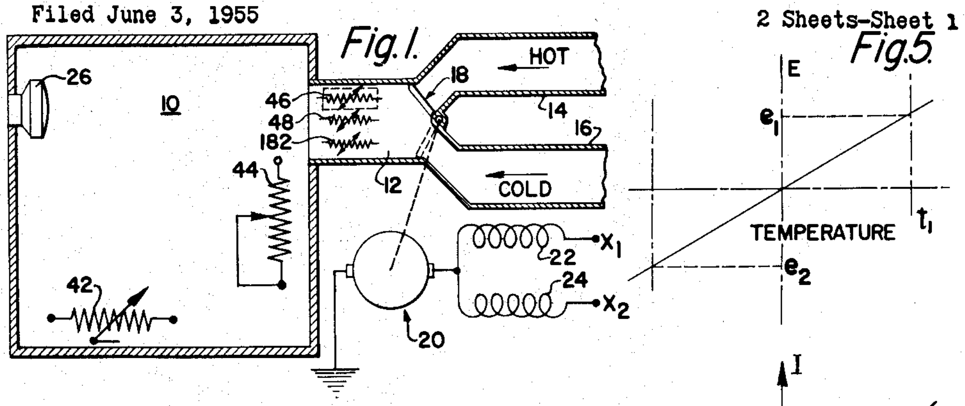
FIG. 1 is a schematic drawing of a compartment whose temperature is to be controlled in accordance with the present invention.
FIG. 5 is a graph showing the bridge output from the Wheatstone resistor bridge end of the circuit shown in FIGURE 4.

Referring now to FIG. 1, a compartment 10, whose temperature is to be kept constant, is shown as being supplied with air through a duct 12 from hot and cold supply ducts 14 and 16 respectively, the temperature of the air to duct 12 being regulated by a valve 18 under the control of a bi-directional motor 20 having field windings 22 and 24 for control of the direction of rotation of the motor. A regulator or other outflow means is shown schematically at 26 for the exhaust of the air from the compartment 10. One side of the motor 20 is connected to ground as shown, while the terminals $X_1$ and $X_2$ of fields 22 and 24 respectively are adapted to be connected to similar terminals on the control apparatus 30 shown in FIG. 2. The control apparatus 30 comprises, in the main, the conversion element means 32, the signal modification means 34, and activation element means 36. The activation means 36 has terminals $X_1$ and $X_2$ adapted to be connected to the similarly designated terminals on the windings 22 and 24 of the motor 20, as aforesaid.

As shown in the present embodiment of the invention, the conversion element means 32 comprises a Wheatstone bridge supplied with direct current to the two corner terminals 38 and 40 of the bridge through an adjustable resistor 39. Connected between the terminals 38 and 40 are the resistors 42 and 44 in series and the resistors 46 and 48 likewise in series. The intermediate terminals 50 and 52 of the bridge are adapted to be connected to the magnetic amplifier as hereinafter described. The resistor 42 may be a compartment temperature pickup of the thermistor type, while the resistor 44 may be a variable rheostat or potentiometer acting as a temperature selector. Resistors 46 and 48 may be of constant resistance or may be variable as indicated, in which case they are adapted to be placed in the duct 12 shown in FIG. 1 for the purpose of anticipator action, as will be further described hereinafter. The resistor or potentiometer 39 is manually adjustable so as to provide "deadband" control by adjustment of the voltage applied to the bridge. That is, the temperature range within which no activation signal will be provided is governed by the resistor 39. An acceptable temperature deadband may be, for example ±2° F.

The signal modification means 34 comprises a pair of magnetic amplifiers 54 and 56 shown within the broken lines. Amplifier 54 is comprised of the twin-core saturable reactor 58 and the rectifier bridge 60, while the amplifier 56 includes a similar reactor 62 and rectifier bridge 64. The reactor 58 includes load windings 66 and 68, which are connected in series-opposing relationship to eliminate alternating current components in the direct current windings, after the manner well known in the art. Likewise, the reactor 62 includes load windings 70 and 72 which are similarly connected.

One end of winding 66 is connected to one terminal of the secondary 74 of the transformer 76, the primary of which may be connected to any convenient alternating current source. The other terminal of winding 74 is connected to a terminal 78 of the rectifier bridge 60. The terminal 80 of the bridge 60 is connected to one end of the winding 68. The rectifier elements of the bridge 60 are poled as shown, and it is thus seen that alternating current, as supplied by the secondary 74 of the transformer, will now flow in the windings 66 and 68. The reactor 58 further comprises the feedback winding 82, one end of which is connected with one intermediate terminal 86 of the rectifier bridge 60, the opposite intermediate terminal 88 of the rectifier bridge having a connection with one end of the winding 90 of the differential relay 92. The other end of the winding 90 is connected to the lower end of the winding 82 on the saturable reactor 58. The relay winding 90 is provided with a capacitor 94 connected across its terminals in order to bypass harmonic currents which may exist in the circuit.

In a similar fashion the reactor 62 is provided with load windings 70 and 72, with one end of the winding 70 having a connection with the secondary 100 of the transformer 76. The other terminal of the secondary 100 is connected to a terminal 102 of the rectifier bridge 64 while the opposite terminal 104 has a connection with one end of the load winding 72 of the reactor 62. The intermediate terminal 106 of the bridge 64 is connected to one end of the feedback winding 108 with the other end connected to one end of the winding 112 of the differential relay 92. The other end of the winding 112 has a connection with the intermediate terminal 114 of the bridge 64. A capacitor 116 is provided connected across the terminals of the winding 112 to suppress harmonic currents.

The reactor 58 also includes a control winding 118 which is poled as indicated by the plus sign on the upper end thereof. Likewise, the reactor 62 is provided with a control winding 122 which is poled in a similar fashion as shown by the plus sign on the upper end thereof, the lower end of winding 118 and the upper end of winding 122 being connected together by a conductor 121.

The conversion element 32 comprising the bridge having the temperature pickup and temperature selector resistors in it has a connection from the terminal 50 to the winding 118 through a conductor 115, while the terminal 52 is connected with the winding 122 by way of a conductor 125. As thus far described, the magnetic amplifiers 54 and 56, together with their connections to the bridge forming a portion of the conversion element 32 and the windings of the relay 92, constitute practice which is well known in the art. However, both of the magnetic amplifiers 54 and 56 are further provided with additional windings on their saturable reactors 58 and 62 which have connections with other elements that provide the novel control system with operating characteristics having utility in many applications.

Thus, through the agency of the extra windings, there is provided means for changing the instantaneous sensitivity state of the magnetic amplifiers upon the occurrence of an event. Such an event could be, for example, the occurrence of a change in the resistance of one of the resistances making up the Wheatstone bridge element 32, in which event the change in the instantaneous sensitivity state of one or both of the magnetic amplifiers exists for a predetermined time interval dependent upon the amplitude of the signal from the conversion element. Another event, the occurrence of which would cause a change in the instantaneous sensitivity state of the magnetic amplifiers, could be a predetermined change in the temperature within the duct 12. Taking the first of these, there will now be described the apparatus which co-operates with the magnetic amplifiers to provide proportional floating control in the temperature regulating system.

The relay 92 comprises a movable contact 126 having a connection with the source of direct current. Adapted to co-operate with the movable contact 126 are the fixed contacts 128 and 130 having connections with the relay coils 132 and 134, respectively, of the relays 136 and 138. The other sides of the coils 132 and 134 are grounded as shown. The relay 136 is provided with a movable contact 140 arranged to co-operate with the fixed contacts 142 and 144, and the relay 138 is provided with a movable contact 146 adapted to co-operate with the fixed contacts 148 and 150. The movable contacts 140 and 146 are connected together as shown, while the fixed contacts 142 and 148 are likewise connected together and to the source of direct current as shown. The other fixed contacts 144 and 150 are arranged to be connected to the terminals $X_1$ and $X_2$ of the motor windings 22 and 24, respectively, as indicated on FIG. 1.

It is now apparent that when the current increases in the winding 90 and decreases in winding 112 of the relay 92, the movable contact 126 will be urged into a connection with the fixed contact 128, whereby current will be furnished through the movable contact to the fixed contact, and thence to the winding 132 of the relay 136. The relay 136 will then actuate its movable contact 140 away from contact 142 and into connection with the fixed contact 144. Current will now flow from the direct current source through the fixed contact 148 and movable contact 146 of the relay 138 to the movable contact 140 and the fixed contact 144 of the relay 136, and thence to winding 22 of the motor 20 to cause it to move the valve 18 in one direction. If, however, the current increases in winding 112 and decreases in winding 90 of the relay 92, the movable contact 126 will then engage the fixed contact 130, whereupon current will flow through the movable contact 126 and the fixed contact 130 to the winding 134 of the relay 138 so as to energize the same. Actuation of the relay 138 causes the movable contact 146 to move away from its connection with the fixed contact 148 into connection with the fixed contact 150. Current will now flow from the direct current source through the fixed contact 142 and movable contact 140 of the relay 136 over to the movable contact 146 and fixed contact 150 of the relay 138, and thence to the winding 24 of the motor 20 to cause the valve to move in the opposite direction.

The above described method of connecting up the fixed and movable contacts of the relays 136 and 138 provides assurance that, in the event that both the relays should be energized at the same time, no current will flow through the contacts to either of the motor windings 22 or 24 of the motor 20. The circuit is conventional in electrical practice.

The relay 136 is further provided with a movable contact 152 arranged to co-operate with the fixed contacts 154 and 156. The movable contact 152 is connected with the direct current source as shown. The fixed contact 156 has a connection with one end of the resistor 158, the other end of which joins the connection of one end of the resistor 160, one side of the capacitor 162, and one end of the winding 164 on the reactor 62. A similar winding 168 on the saturable reactor 58 is connected in series with the winding 164 through a conductor 167 and with one end of the resistor 172, the other end of which is arranged to be connected with the other side of the capacitor 162 and the ground as shown. Windings 164 and 168 may be conveniently referred to as pulse windings.

The relay 138, like that of the relay 136, is provided with a movable contact 174 and fixed contacts 176 and 178, with the movable contact 174 connected to the same direct current source as the movable contact 152 of the relay 136. The fixed contact 178 is connected with the fixed contact 156 of the relay 136 and thereby with one end of the resistor 158. Thus, actuation of either of the relays 136 and 138 will provide current from the direct current source through either of the movable contacts 152 or 174 to the fixed contacts 156 or 178, respectively, and, thence, to the resistor 158.

The resistors 158, 160, and 172, together with the capacitor 162, comprise what may be termed a pulse network, the latter being indicated by broken lines and referenced as 180. The pulse network 180 constitutes a time-constant network which is arranged to vary the current through the pulse windings 164 and 168. It will be apparent, of course, that the inductance of the reactor windings also enters into the calculation of the time-constant.

It will now be seen that when the apparatus 30 is in balance by reason of a zero signal from the conversion element 32, the movable contact 126 of the differential relay 92 is substantially intermediate the fixed contacts 128 and 130, whereby no current will be flowing in either of the relay windings 132 or 134, hence, no current in the motor 20. The steady state current through the pulse windings 164 and 168 by way of the resistor 160 is of a value such as to bias the amplifier to maximum sensitivity. (See, for example, difference curve 127 on FIG. 3). Thus, the valve 18 remains in fixed position with a substantially constant temperature air being supplied from the ducts 14 and 16 to the compartment 10.

If, for example, the temperature selector 44 is moved to a new position, the bridge of the conversion element 32 will become unbalanced and a current will flow through the conductors 119 and 125 and the control windings 118 and 122 of the reactors 58 and 62, the amount of the current being dependent upon the extent of unbalance, and the direction of flow dependent upon the direction of unbalance. In that event, the current flowing in the windings 90 and 112 of the relay 92 will become unbalanced and the movable contact 126 of the relay 92 will be actuated into contact with either of the fixed contacts 128 or 130, depending upon the direction of the unbalance signal from the conversion element 32. One or the other of the relays 136 or 138 of the activation element 36 will thereupon be actuated to connect the direct current source through either of the movable contacts 152 or 174 and the fixed contacts 156 or 178, respectively, with the resistor 158.

Thus, by reason of the direct continuous connection of the pulse windings to the direct current source through the resistors 160 and 172, a small steady state threshold current will flow through these windings, and the capacitor will be charged to a nominal value. When either of the relays close, a parallel current path is provided through the resistor 158, and current in the windings will increase in accordance with the voltage increase across the terminals of the capacitor, as determined by its charging rate when considered with the changed resistance values in the circuit together with the self-inductance of the amplifier windings.

Figure 3:
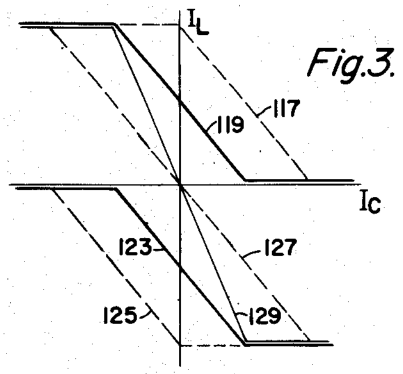
FIG. 3 is a transfer curve that is characteristic of the differential operation of both of the magnetic amplifiers employed in a circuit such as shown in FIGURE 2.

This change in current level in the pulse winding alters the bias in such a way as to reduce the sensitivity of the amplifiers (difference curve 129 on FIG. 3). When the sensitivity is reduced sufficiently, the relay 92 will drop out due to insufficient control current for the new sensitivity. This results in either relay 132 or 134 opening.

Meanwhile, before the relay 92 opens, the motor 20 will have been energized to move the valve 18. Movement of the valve 18, of course, alters the temperature of the air entering the compartment 10, such alteration being in a direction desired by the initial resetting of the selector 44. The temperature change is sensed by the pickup resistor 42 and alters its value in a direction of balance of the bridge in the conversion element 32. Thus, when the relay 92 opens, the signal to the magnetic amplifier control windings will have decreased somewhat.

The opening of the relay 92 interrupts the circuit to the motor 20, whereupon valve movement ceases. Also, the parallel path for direct current through the resistor 158 is opened, removing the higher charging voltage from the capacitor 162 and allowing it to dissipate its charge through the pulse windings and resistor 172 until the current through these windings is sufficient to bias the amplifiers to maximum sensitivity (the steady state current level). In the event that sufficient control current still exists due to a bridge unbalance, the pulse current may not return all the way to its steady state value, but may decrease until the sensitivity is increased to a point where relay 92 will pickup.

It can now be seen that it is a characteristic of the operational circuit that pulses of long duration interrupted by relatively short intervals of "off-time" will accompany a large unbalance signal. A small unbalance signal will cause pulses of short duration interrupted by long intervals of "off-time." A further characteristic of the circuit is that the cyclic pulse frequency is high when the unbalance signal is large, but of low frequency when a small unbalance signal appears.

Briefly stated, if the unbalance is large, the power pulses are long and occur at a high frequency; as the system approaches balance, the frequency decreases as does the length of the power pulses, until at near balance the pulses are very sharp and of much lower frequency.

It is now apparent that the valve 18 will be moved from its previous steady state position by a pulsing or on-off full torque operation of the motor 20, the length of the pulses being in accordance with the amplitude of the signal from the pickup element 42. It is apparent, of course, that the overall system constitutes a closed loop. That is, any change of the valve position will result in a change in the temperature in the compartment 10, which in turn, will be sensed by the temperature pickup element 42. The changing temperature, as sensed by the temperaure pickup 42, thus results in a change of the signal from the conversion element 32.

Hence, it is seen that as the temperature in the compartment approaches that which was preselected by the selector 44, the signal from the conversion element decreases with the net result that the length of the pulses supplied to the motor 20 by the activation element 36 become shorter in duration with a greater time interval between each of the pulses.

A clear understanding of the pulsing action of the control may be had by reference to FIGURE 3, where $I_C$ indicates the control current flowing through the control windings 118 and 122, while $I_L$ indicates the current flowing through the relay windings 90 and 112. Curve 117 indicates (schematically) the transfer curve for one of the magnetic amplifiers, say amplifier 54, in the absence of other than a steady state bias voltage on the pulse windings. Curve 125 is the corresponding transfer curve for amplifier 56 under the same conditions.

Since the two amplifiers 54 and 56 are differentially connected, the transfer curves 117 and 125 have been shown in appropriate quadrants of the plot. In other words, curve 125 is identical with curve 117 reflected on both the $I_C$ and $I_L$ axes. It will be understood, of course, that these curves are drawn very schematically. Curve 119 corresponds to curve 117, but with a pulse bias current flowing through the pulse windings. Similarly, curve 123 corresponds to curve 125 with a pulse bias current flowing through the pulse windings. Curve 127 represents the difference of curves 117 and 125, and, similarly, curve 129 represents the difference of curves 119 and 123.

Accordingly, it will be seen that by increasing the current in the pulse windings, the transfer curve rotates from the position 127 to the position 129. This, of course, is accomplished by the closing of the relay contacts 152 and 156, or the relay contacts 174 and 178. Consequently, when an error signal is received from the conversion element 32, which will cause a greater current flow, say through the winding 90 of the relay, the relay is energized and will close the contacts 152 and 156 of relay 136.

The transfer curve rotates now from, say curve 129 to curve 127. The rate of rotation being dependent on the time constant of the circuit capacitor 162 and the resistors 158 and 160 and the re-magnetization time of the core material. Also, the rate of return rotation of the differential transfer curve is dependent on a different circuit composed of capacitor 162 and the resistors 172 and 160. As a result, the circuit becomes less sensitive and the error signal will soon be unable to maintain the differential relay energized. By this means, a floating proportional control is obtained and the relay is intermittently energized to pulse the element controlled by the relay.

Any tendency of the system to overshoot or hunt may be further reduced by providing anticipator action in the conversion element 32 by means of the anticipator resistors 46 and 48. In this case, it is desirable to mount the resistors 46 and 48 in the supply duct 12 so as to sense temperature change immediately downstream from the valve 18, and prior to change in the temperaure in the compartment 10. To this end, it is desirable that one of the resistors 46 and 48 be provided with thermal lagging in order that its resistance will not change at the same rate as that of the other anticipator resistor, the difference in the rate of change of the resistors being a function to a large extent of the volume of the compartment whose temperature is to be controlled.

Desirably, the thermally lagged resistor, in this case the resistor 46, should have a rate of change of temperature approximately the same as that of the temperature of the air in the compartment 10. This type of anticipator action is well known in connection with electron tube type temperature controllers and in that connection a Wheatstone bridge similar to that shown in the conversion element 32 has been employed. The action of such anticipator elements in those applications is well known to those skilled in the art and need not be further amplified.

A further novel and extremely important element of the present invention is the provision of temperature responsive means adapted to override the action of the temperature sensing eelments 42, 46, and 48, in the event of an extreme variaion in temperature at a point in the temperature control system. To this end there is provided in the duct 12 a temperature sensing element comprising a resistor 182.

Figure 2:
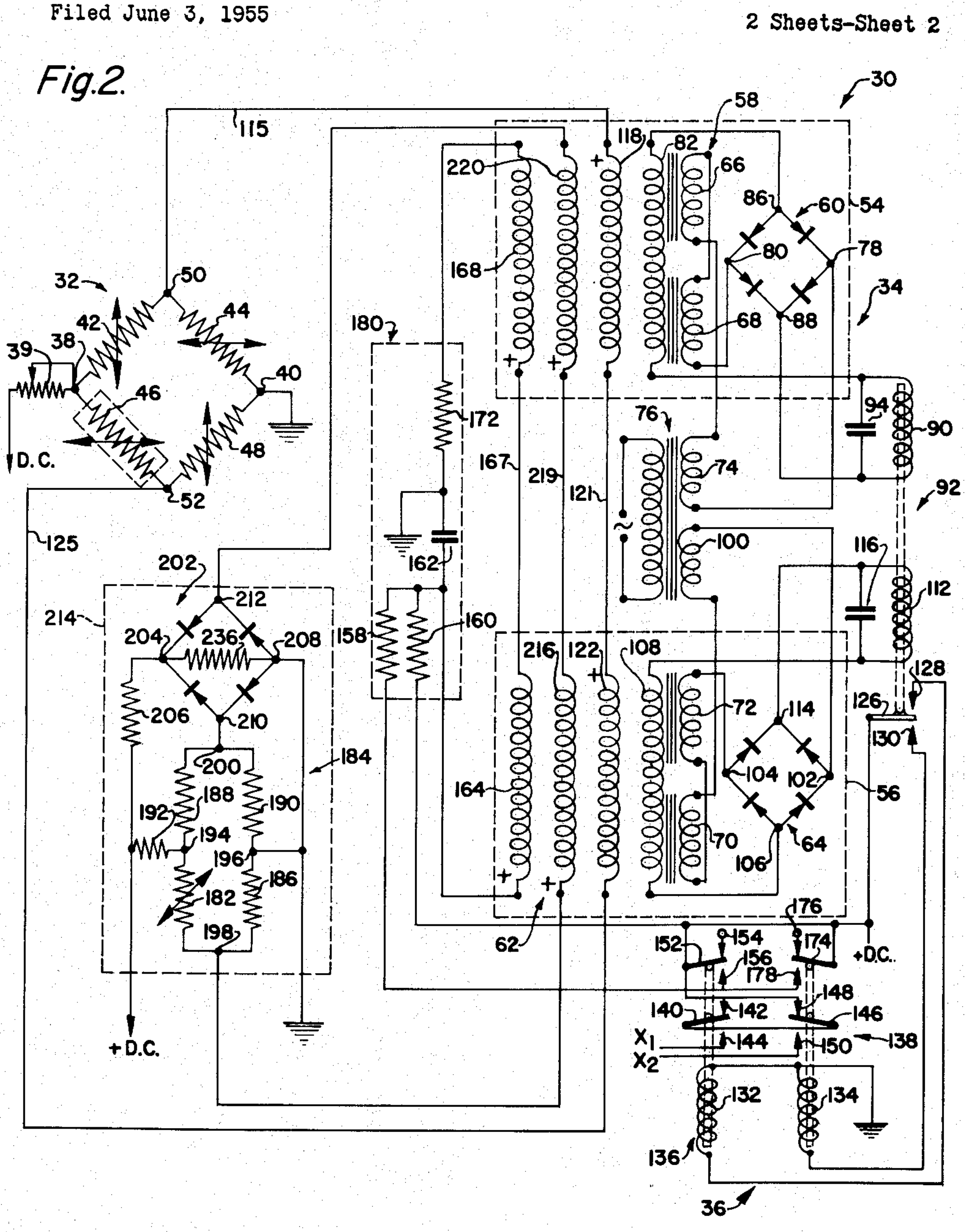
FIG. 2 is a schematic wiring diagram of one embodiment of the invention showing the wiring of the various parts thereof.

Referring to FIG. 2, the resistor 182 is included as one element of a variable voltage source including the Wheatstone bridge 184 comprising the resistors 186, 188, and 190. The terminal point 194 of the resistors 182, and 188 is connected through a resistor 192 to the source of direct current, while the terminal point 196 of the resistors 186 and 190 is connected to ground. The intermediate terminal point 198 of resistors 182 and 186, and the terminal 200 of the resistors 188 and 190 constitute terminal points for a source of voltage which will vary in accordance with the resistance of the temperature pickup 182 in the duct 12.

A source of bias voltage including the rectifier bridge 202 is adapted to co-operate with the Wheatstone bridge 184 so as to provide a novel circuit having a net output voltage which is referable to the bias voltage supplied by the rectifier bridge 202, which will be more particularly described hereinafter. The bridge 202 has one corner terminal 204 thereof connected through the resistor 206 to the direct current source while the other corner terminal 208 is connected to the ground. The intermediate corner terminal 210 is connected directly to the terminal 200 of the bridge 184. The other intermediate corner terminal 212 and the terminal 198 of the bridge 184 are adapted to be connected to an external circuit so as to provide the novel temperature limiting circuit hereinabove referred to. A resistor 236 is provided intermediate the terminals 204 and 208.

Thus, terminal 198 and intermediate terminal 212 comprise output terminals of the limiter which has been designated by the reference numeral 214, included within the broken line shown. In the present embodiment, terminals 198 and 212 have a closed circuit through the limiter control windings 216 and 220 of the reactors 56 and 54, respectively, the limiter windings being poled as shown by the plus marks on the lower sides thereof. The two windings are joined in series by the conductor 219, and may be conveniently referred to as limiter windings.

Figure 4:
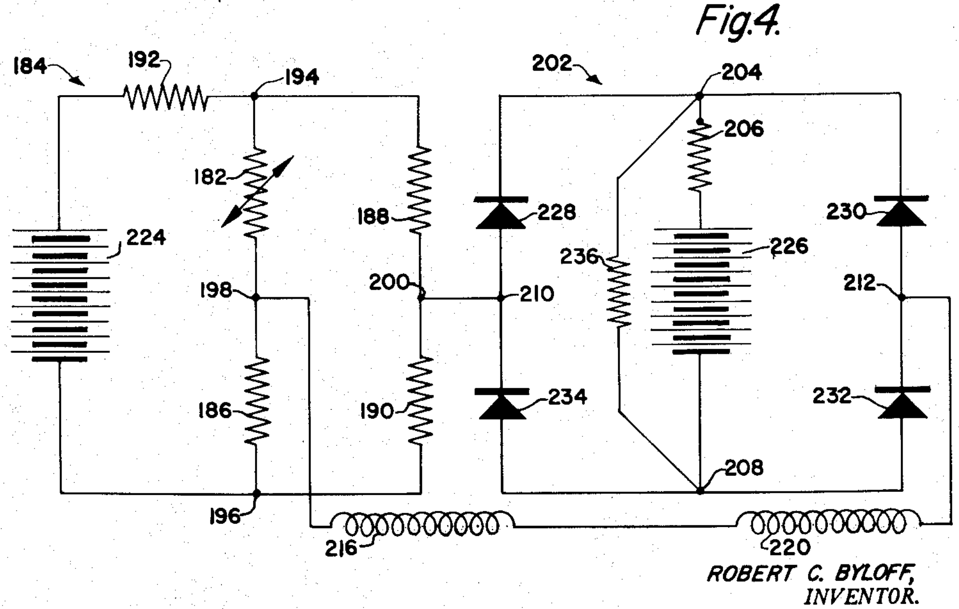
FIG. 4 is a schematic wiring diagram of the novel temperature limiter employed in connection with the magnetic amplifier.

Reference to FIG. 4 permits a rapid visualization of the circuit employed, together with the function of the component bridges separately and co-operatively. As noted above, the bridge 184 is a simple Wheatstone type whose output at the terminals 198 and 200 will be zero under a particular condition of temperature sensed by the resistor 182. That temperature may be conveniently referred to as the median temperature existent substantially midway between extreme upper and lower limits within which it is desirable that the limiter apply substantially zero voltage to the limiter windings 216 and 220 on the magnetic amplifiers. Between those upper and lower temperature limits, the voltage at the terminals 198 and 200 will vary substantially linearly as the temperature in the duct 12, as depicted in FIG. 5.

The rectifier elements 228, 230, 232, and 234 are poled as shown, and it is at once apparent that the back resistance of the rectifier bridge effectively blocks flow of current, due to battery 226, from the terminal 204 to terminal 208, hence, the bias voltage source alone, comprising the battery 226 and the rectifier bridge, has substantially zero output voltage at its output terminals 210 and 212.

However, when the variable voltage source 184 has its output terminals 198 and 200 connected to the bias source terminals 210 and 212 through the external load (in this case, the limiter windings), a current may be made to flow from the limiter output terminal 198 to the output terminal 212 when the effective bridge output voltage between terminals 198 and 200 is greater, say in the positive sense, than the effective voltage across the same terminals due to the battery 226. In this case the current path would be, respectively, terminal 198 through the windings 216 and 220 to the terminal 212, to the terminal 204 through the rectifier eelment 230, to terminal 208 through the resistor 236, to terminals 210 and 200 through the rectifier element 234, to terminal 196 through the resistor 190, to terminal 194 through the battery 224 and resistor 192, and, thence, to terminal 198 through the resistor 182.

Current may be made to flow from terminal 212 through the windings to terminal 198 when the effective bridge output voltage between terminals 198 and 200 is greater in a negative sense than the effective voltage of the battery 226. In this case the current path would be, respectively, terminal 212 through the windings to terminal 198, to terminal 196 through the resistor 186, to terminal 194 through the battery 224 and resistor 192, to terminals 200 and 210 through the resistor 188, to terminal 204 through the rectifier element 228, to terminal 208 through the resistor 236, and thence to terminal 212 through the rectifier element 232.

It will be observed that the "sense" flow of the current is determined solely by the direction of departure of the thermistor 182 from its median value, and hence, of the departure direction of the air temperature in the duct 12.

Figure 6:
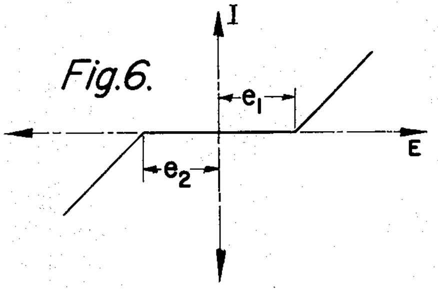
FIG. 6 is a graph showing the combined output of the Wheastone bridge and the biased rectifier bridge on the right hand side of the wiring diagram shown in FIGURE 4.

This is effectively depicted by the graphs of FIGURES 5 and 6. In FIG. 5 there is shown a plot of duct temperature T as the abscissa, versus voltage output E at the terminals 198 and 200 as the ordinate. At a temperature of $t_1$ the output voltage will be positive and have a voltage of $e_1$. Transferring the voltage values to the graph of FIG. 6, where voltage E is plotted against the output current I between the terminals 198 and 212, it is now seen that when the effective voltage $e_1$ of the bridge 184, as exhibited at the terminals 210 and 212, is greater in a positive sense than the effective bridge bias voltage exhibited at the terminals 204 and 208 of the bias bridge 202, a current $i_1$ will flow through the limiter windings. Conversely, when the effective voltage $e_2$ of the bridge is greater in a negative sense than that of the sensing bridge 184, a current $I_2$ will flow in the opposite direction through the limiter windings.

By reason of the relative polarities of the limiter and control windings, as indicated by the plus marks on FIGURE 2, it is now apparent that an effective limiter is provided by the novel limiter circuit which will override any adverse signal provided to the control windings by the conversion element 32.

Likewise, by judicious selection of the values of the resistors in the bridge 184, together with a consideration of the voltage from the direct current source, it is readily seen that temperature limiting at any point above or below a predetermined median temperature is effectively accomplished by the circuit shown.

Although the use of the batteries is depicted in FIG. 4, it will be apparent to those skilled in the art that any direct current source could be used for the purpose. It is also apparent that the voltage source need not be substantially constant, since under some circumstances it might be desirable that the graph of temperature versus current depicted in FIG. 5 be non-linear. Thus, variable voltage may be applied to either of the bridges 184 or 202, or to both of them.

However, in the present application it is desirable that the voltage be substantially constant in order that the action of the magnetic amplifiers 54 and 56 be predictable with duct temperature variations on either side of the median temperature selected.

Therefore, in the present embodiment of the invention, it is desirable that no current flow in the limiter control windings connected to the limiter within a predetermined range on either side of a preselected median temperature. Then at such time as the temperature increases above or decreases below the predetermined limits, current will flow in the limiter control windings 216 and 220 in such a direction as to reduce the net ampere turns of the control winding and the limiter winding to a minimum, thereby overriding any action called for by the conversion element means 32.

I claim:

1. A control apparatus for a process variable, comprising: activation element means for changing the process variable; conversion element means for providing a signal in accordance with a desired change of the process variable; signal modification means including magnetic amplifier means coupled between said activation and conversion element means, said magnetic amplifier means having a control winding coupled to one of said element means and a sensitivity modification winding adapted to provide a change in the instantaneous sensitivity state of said magnetic amplifier means; and means coupled with said sensitivity modification winding for providing a change of current therein for a predetermined time interval dependent upon a characteristic of the signal provided by said conversion element.

2. A control apparatus for a process variable, comprising: activation element means for changing the process variable; conversion element means for providing a signal in accordance with a desired change of the process variable; signal modification means including magnetic amplifier means coupled between said activation and conversion element means, said magnetic amplifier means having a control winding coupled to one of said element means and a sensitivity modification winding adapted to provide a change in the instantaneous sensitivity state of said magnetic amplifier means; and network means coupled between said winding and the output of said modification means for changing the current in said winding for a predetermined time interval dependent upon a characteristic of the signal provided by said conversion element.

3. A control apparatus for a process variable, comprising: activation element means for changing the process variable; conversion element means for providing a signal in accordance with a desired change of the process variable; signal modification means including magnetic amplifier means coupled between said activation and conversion element means, said magnetic amplifier means having a winding adapted to provide a change in the instantaneous sensitivity state of said magnetic amplifier means; and time-constant network means coupled between said winding and the output of said modification means for changing the current in said winding for a predetermined time interval dependent upon a characteristic of the signal provided by said conversion element.

4. A control apparatus for a process variable, comprising: activation element means for changing the process variable; conversion element means for providing a signal in accordance with a desired change of the process variable; signal modification means including magnetic amplifier means coupled between said activation and conversion element means, said magnetic amplifier means having a load winding coupled to said activation element means and a control winding coupled to said conversion element means; a sensitivity modification winding on said magnetic amplifier means; and a resistance-capacitor network coupled between said modification winding and the output of said modification means.

5. A control apparatus for a process variable, comprising: activation element means for changing the process variable; conversion element means for providing a signal in accordance with a predetermined variation of the process variable; and signal modification means including magnetic amplifier means coupled to said activation element means, said magnetic amplifier means having a control winding and a limiter winding coupled to said conversion element means, said conversion element means comprising a bridge having a resistor whose resistance changes with variations of the process variable, and further comprising a source of bias voltage, said resistor and bias source being coupled with said winding in such manner that a change is provided in the net control ampere-turns of said magnetic amplifier means upon the occurrence of a predetermined change of the process variable.

6. A control apparatus for a process variable, comprising: activation element means for changing the process variable; conversion element means for providing a signal in accordance with a predetermined variation of the process variable; and signal modification means including magnetic amplifier means coupled to said activation element means, said magnetic amplifier means having a control winding and a limiter winding coupled to said conversion element means, said conversion element means comprising a resistor whose resistance changes with variations of the process variable, and further comprising a source of bias voltage including a rectifier bridge, said resistor and bias source being coupled with said winding in such manner that a change is provided in the net control ampere-turns of said magnetic amplifier means upon the occurrence of a predetermined change of the process variable.

7. A control apparatus for a process variable, comprising: activation element means for changing the process variable; conversion element means for providing a signal in accordance with a predetermined variation of the process variable; and signal modification means including magnetic amplifier means coupled to said activation element means, said magnetic amplifier means having a control winding and a limiter winding coupled to said conversion element means, said conversion element means comprising a bridge having a resistor whose resistance changes with variations of the process variable, and further comprising a source of bias voltage including a rectifier bridge, said bridges being coupled with said windings in such manner that a change is provided in the net control ampere-turns of said magnetic amplifier means upon the occurrence of a predetermined change of the process variable.

8. A control apparatus for a process variable, comprising: activation element means for changing the process variable; conversion element first means for providing a signal in accordance with a desired change of the process variable; conversion element second means for providing a signal in accordance with a predetermined variation of the process variable; and signal modification means including magnetic amplifier means coupled to said activation element means, said magnetic amplifier means having windings coupled to said conversion element means, one of said windings being adapted to provide a change in the instantaneous sensitivity state of said magnetic amplifier means for a predetermined time interval dependent upon a characteristic of the signal provided by the conversion element means coupled thereto, the other of said windings providing an overriding change upon the occurrence of a predetermined change of the process variable.

9. A control apparatus for a process variable, comprising: activation element means for changing the process variable; conversion element first means for providing a signal in accordance with a desired change of the process variable; conversion element second means for providing a signal in accordance with a predetermined variation of the process variable; a signal modification means including magnetic amplifier means coupled to said activation element means, said magnetic amplifier means having windings coupled to said conversion element means; and means coupled to one of said windings for providing a change of current flowing therein for a predetermined time interval dependent upon a characteristic of the signal provided by the conversion element means coupled thereto, the other af said windings providing an overriding change in the net control ampere-turns of said magnetic amplifier means upon the occurrence of a predetermined change of the process variable.

10. A control apparatus for a process variable, comprising: activation element means for changing the process variable; conversion element first means for providing a signal in accordance with a desired change of the process variable; conversion element second means for providing a signal in accordance with a predetermined variation of the process variable; signal modification means including magnetic amplifier means coupled to said activation element means, said magnetic amplifier means having windings coupled to said conversion element means; and network means coupled between one of said windings and the output of said modification means for providing a change of current flowing in said one of said windings for a predetermined time interval dependent upon a characteristic of the signal provided by the conversion element means coupled thereto, the other of said windings providing an overriding change in the net control ampere-turns of said magnetic amplifier means upon the occurrence of a predetermined change of the process variable.

11. A control apparatus for a process variable, comprising: activation element means for changing the process variable; conversion element first means for providing a signal in accordance with a desired change of the process variable; conversion element second means for providing a signal in accordance with a predetermined variation of the process variable; signal modification means including magnetic amplifier means coupled to said activation element means, said magnetic amplifier means having windings coupled to said conversion element means; and time-constant network means coupled between one of said windings and the output of said modification means for providing a change of current flowing in said one of said windings for a predetermined time interval dependent upon a characteristic of the signal provided by the conversion element means coupled thereto, the other of said windings providing an overriding change in the net control ampere-turns of said magnetic amplifier means upon the occurrence of a predetermined change of the process variable.

12. A control apparatus for a process variable, comprising: activation element means for changing the process variable; conversion element first means for providing a signal in accordance with a desired change of the process variable; conversion element second means for providing a signal in accordance with a predetermined variation of the process variable; a signal modification means including magnetic amplifier means coupled to said activation element means, said magnetic amplifier means having windings coupled to said conversion element means; and a resistance-capacitor network coupled between one of said windings and the output of said modification means for providing a change of current flowing in said one of said windings for a predetermined time interval dependent upon a characteristic of the signal provided by the conversion element means coupled thereto, the other of said windings providing an overriding change in the net control ampere-turns of said magnetic amplifier means upon the occurrence of a predetermined change of the process variable.

13. A control apparatus for a process variable, comprising: activation element means for changing the process variable; conversion element first means for providing a signal in accordance with a desired change of the process variable; conversion element second means for providing a signal in accordance with a predetermined variation of the process variable; signal modification means including magnetic amplifier means having a load winding coupled to said activation element means and a control winding coupled to said conversion element first means; a sensitivity modification winding on said magnetic amplifier means; a resistance-capacitor network coupled between said sensitivity modification winding and the output of said modification means for changing the current in said sensitivity modification winding upon the occurrence of a change in the output of said modification means; and a limiter winding on said magnetic amplifier means coupled with said conversion element second means so as to provide a change in the net control ampere-turns upon the occurrence of a predetermined change of the process variable.

14. A control apparatus for a process variable, comprising: activation element means for changing the process variable; conversion element signal means; and signal modification means including magnetic amplifier means coupled to said activation element means, said magnetic amplifier means having control and limiter windings coupled to said conversion element signal means, one of said conversion element signal means comprising conversion element means coupled with said control winding and another comprising a bridge having a resistor whose resistance changes with variations of the process variable, and further comprising a source of bias voltage, said resistor and bias source being coupled with said limiter winding in such manner that a change is provided in the net control ampere-turns of said magnetic amplifier means upon the occurrence of a predetermined change of the process variable, the other of said conversion element signal means being coupled to another of said windings for providing a change of current flowing therein for a predetermined time interval dependent upon a characteristic of a signal provided by the conversion element means coupled thereto.

15. A control apparatus for a process variable, comprising: activation element means for changing the process variable; conversion element signal means; and signal modification means including magnetic amplifier means coupled to said activation element means, said magnetic amplifier means having control and limiter windings coupled to said conversion element signal means, one of said conversion element signal means comprising conversion element means coupled with said control winding and another comprising a resistor whose resistance changes with variations of the process variable, and further comprising a source of bias voltage including a rectifier bridge, said resistor and bias source being coupled with said limiter winding in such manner that a change is provided in the net control ampere-turns of said magnetic amplifier means upon the occurrence of a predetermined change of the process variable, the other of said conversion element signal means being coupled to another of said windings for providing a change of current flowing therein for a predetermined time interval dependent upon a characteristic of the signal provided by the conversion element means coupled thereto.

16. A control apparatus for a process variable, comprising: activation element means for changing the process variable; conversion element signal means; and signal modification means including magnetic amplifier means coupled to said activation element means, said magnetic amplifier means having control and limiter windings coupled to said conversion element signal means, one of said conversion element signal means comprising conversion element means coupled with said control winding and another comprising a bridge having a resistor whose resistance changes with variations of the process variable, and further comprising a source of bias voltage including a rectifier bridge, said bridges being coupled with said limiter winding in such manner that a change is provided in the net control ampere-turns of said magnetic amplifier means upon the occurrence of a predetermined change of the process variable, the other of said conversion element signal means being coupled to another of said windings for providing a change of current flowing therein for a predetermined time interval dependent upon a characteristic of the signal provided by the conversion element means coupled thereto.

17. A control apparatus for a process variable, comprising: activation element means for changing the process variable; conversion element first means for providing a signal in accordance with the desired change of the process variable; conversion element second means for providing a signal in accordance with a predetermined variation of the process variable, said second means comprising a bridge having a resistor whose resistance changes with variations of the process variable, and further comprising a source of bias voltage including a rectifier bridge; signal modification means including magnetic amplifier means having a load winding coupled to said activation element means and a control winding coupled to said conversion first means; a sensitivity modification winding on said magnetic amplifier means; a resistance-capacitor network coupled between said sensitivity modification winding and the output of said modification means for changing the current in said sensitivity modification winding upon the occurrence of a change in the output of said modification means; and a limiter winding on said magnetic amplifier means coupled with said conversion element second means and said bridges so as to provide a change in the net control ampere-turns of said magnetic amplifier means upon the occurrence of a predetermined change of the process variable.

18. An electrical circuit comprising: a source of variable voltage; and a source of bias voltage comprising a rectifier bridge having input terminal connected to a source of direct current and output terminals coupled with said variable voltage source, the coupled sources having a net output voltage referable to the voltage across the bridge input terminals over a predetermined range of the voltage at said variable voltage source.

19. An electrical circuit comprising: a source of variable voltage including a resistor, the voltage appearing across the resistor being determinative of the voltage of said source; and a source of a bias voltage comprising a rectifier bridge having input terminals connected to a source of direct current and output terminals coupled with said variable voltage source, the coupled sources having a net output voltage referable to the voltage across the bridge input terminals over a predetermined range of the voltage at said variable voltage source.

20. An electrical circuit comprising: a source of variable voltage including a bridge having an electrical element, the voltage appearing across the element being determinative of the voltage of said source; and a source of bias voltage comprising a rectifier bridge having input terminals connected to a source of direct current and output terminals coupled with said variable voltage source, the coupled sources having a net output voltage referable to the voltage across the rectifier bridge input terminals over a predetermined range of the voltage at said variable voltage source.

21. An electrical circuit comprising: a source of variable voltage including a bridge having a resistor in one leg thereof, the voltage appearing across the resistor being determinative of the voltage of said source; and a source of bias voltage comprising a rectifier bridge having input terminals connected to a source of direct current and output terminals coupled with said variable voltage source, the coupled sources having a net output voltage referable to the voltage across the rectifier bridge input terminals over a predetermined range of the voltage at said variable voltage source.

References Cited in the file of this patent

UNITED STATES PATENTS

| | | |
|---|---|---|
| 2,594,022 | Horton | Apr. 22, 1952 |
| 2,650,986 | Semm | Sept. 1, 1953 |
| 2,792,541 | Markow | May 14, 1957 |

OTHER REFERENCES

"Magnetic Amplifiers," by Storm, copyright 1955, pages 193 to 195, published by John Wiley and Son, Inc., New York, New York.

UNITED STATES PATENT OFFICE

CERTIFICATE OF CORRECTION

Patent No. 3,021,474 February 13, 1962

Robert C. Byloff

It is hereby certified that error appears in the above numbered patent requiring correction and that the said Letters Patent should read as corrected below.

Column 1, line 29, strike out "a"; column 7, lines 10, and 11, for "change", each occurrence, read -- changes --; same column 7, line 33, for "eelments" read -- elements --; line 34, for "variaion" read -- variation --; column 8, line 35, for "eelment" read -- element --; column 11, line 27, for "af" read -- of --; column 14, line 2, for "terminal" read -- terminals --.

Signed and sealed this 4th day of September 1962.

(SEAL)
Attest:

ERNEST W. SWIDER
Attesting Officer

DAVID L. LADD
Commissioner of Patents